United States Patent
Takai et al.

(10) Patent No.: US 11,215,763 B2
(45) Date of Patent: Jan. 4, 2022

(54) ELASTIC MEMBER AND OPTICAL CONNECTOR

(71) Applicants: JAPAN COMMUNICATION ACCESSORIES MANUFACTURING CO., LTD., Komaki (JP); SUMITOMO ELECTRIC OPTIFRONTIER CO., LTD., Yokohama (JP); SUMITOMO ELECTRIC INDUSTRIES, LTD., Osaka (JP)

(72) Inventors: Yusuke Takai, Komaki (JP); Tsutomu Kamada, Yokohama (JP); Motoyoshi Kimura, Komaki (JP); Fumiya Uehara, Osaka (JP); Masaki Omura, Osaka (JP)

(73) Assignees: JAPAN COMMUNICATION ACCESSORIES MANUFACTURING CO., LTD., Komaki (JP); SUMITOMO ELECTRIC OPTIFRONTIER CO., LTD., Yokohama (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/054,430

(22) PCT Filed: May 21, 2019

(86) PCT No.: PCT/JP2019/020153
§ 371 (c)(1),
(2) Date: Nov. 10, 2020

(87) PCT Pub. No.: WO2019/230504
PCT Pub. Date: Dec. 5, 2019

(65) Prior Publication Data
US 2021/0215889 A1 Jul. 15, 2021

(30) Foreign Application Priority Data

May 28, 2018 (JP) .............................. JP2018-101484

(51) Int. Cl.
*G02B 6/38* (2006.01)

(52) U.S. Cl.
CPC .......... *G02B 6/3821* (2013.01); *G02B 6/3858* (2013.01)

(58) Field of Classification Search
None
See application file for complete search history.

(56) References Cited

U.S. PATENT DOCUMENTS 5,769,671 A * 6/1998 Lim ..................... H01R 13/187
439/843
8,706,229 B2 * 4/2014 Lahti ..................... A61N 1/3752
607/37

(Continued)

FOREIGN PATENT DOCUMENTS

JP   H10-160973 A   6/1998
JP   2007-140422 A  6/2007

(Continued)

OTHER PUBLICATIONS

Jul. 9, 2019 Search Report issued in International Patent Application No. PCT/JP2019/020153.

*Primary Examiner* — Jerry Rahll
(74) *Attorney, Agent, or Firm* — Oliff PLC (57) ABSTRACT

An elastic member according to an embodiment is an elastic member that biases a ferrule retaining a plurality of optical fibers in a connecting direction. The elastic member is stored in an inner housing that accommodates the ferrule, the elastic member has a space in its inside into which a 16-fiber tape fiber is inserted, and the elastic member is in a noncircular shape in a cross section intersecting with the connect- (Continued)

ing direction. The elastic member includes a pair of first portions having an outer surface opposite to a pair of inner surfaces in an arc shape of the housing, the inner surfaces being opposite to each other along a first direction intersecting with the connecting direction and a pair of second portions opposite to the tape fiber along a second direction intersecting with both of the connecting direction and the first direction.

9 Claims, 10 Drawing Sheets

(56) References Cited

U.S. PATENT DOCUMENTS 9,933,582 B1 4/2018 Lin
2010/0080518 A1* 4/2010 Teo .................. G02B 6/428
                                                385/92
2016/0091671 A1* 3/2016 Nguyen ............ G02B 6/3893
                                                385/81
2017/0090126 A1* 3/2017 Lu .................. G02B 6/3821
2017/0139157 A1 5/2017 Kanno
2017/0160494 A1 6/2017 Watanabe
2017/0205588 A1* 7/2017 Lee ................. G02B 6/3893
2018/0306984 A1 10/2018 Otomitsu
2020/0166711 A1* 5/2020 Hu .................. G02B 6/406
2021/0215889 A1* 7/2021 Takai .............. G02B 6/36

FOREIGN PATENT DOCUMENTS

| JP | 2017-090798 A | 5/2017 |
| JP | 2017-102390 A | 6/2017 |
| JP | 2017-134310 A | 8/2017 |

* cited by examiner

ELASTIC MEMBER AND OPTICAL CONNECTOR

TECHNICAL FIELD

An aspect of the present disclosure relates to an elastic member and an optical connector.

The present application claims the benefit of priority to Japanese Patent Application No. 2018-101484 filed on May 28, 2018, the entire contents of which are herein incorporated by reference.

BACKGROUND ART

Patent Literature 1 describes an optical connector including a ferrule that retains an optical fiber, a spring that is compressed and deformed, and a housing that stores the ferrule and the spring. The ferrule is pressed in the connecting direction of the optical connector by the biasing force of the spring. The optical connector is a so-called MPO connector, and the ferrule is an MT ferrule. The ferrule is provided with a plurality of optical fiber holes, an optical fiber that is a bare fiber is inserted into the individual optical fiber holes and fixed. The spring is in a coil shape, and the spring is in an elliptic shape in a cross section intersecting with the connecting direction. On the inner side of the spring in an elliptic shape, an optical fiber ribbon composed of a bundle of a plurality of optical fibers is passed.

CITATION LIST

Patent Literature

Patent Literature 1: Japanese Unexamined Patent Publication No. 2017-134310

SUMMARY OF INVENTION

An elastic member according to an aspect of the present disclosure is an elastic member configured to bias a ferrule retaining a plurality of optical fibers in a connecting direction. The elastic member is stored in a housing configured to accommodate the ferrule, the elastic member has a space in the inside of the elastic member into which a 16-fiber tape fiber is inserted, and the elastic member is in a noncircular shape in a cross section intersecting with the connecting direction. The elastic member includes a pair of first portions having an outer surface opposite to a pair of inner surfaces in an arc shape of the housing, the inner surfaces being opposite to each other along a first direction intersecting with the connecting direction and a pair of second portions opposite to the tape fiber along a second direction intersecting with both of the connecting direction and the first direction.

An optical connector according to an aspect of the present disclosure includes the above-described elastic member, at least one tape fiber, a ferrule configured to retain a plurality of optical fibers extending from the tape fiber, and a housing configured to store the ferrule and the elastic member. The ferrule has an end face provided at one end of the connecting direction and has a plurality of optical fiber retention holes, the plurality of optical fibers being individually inserted into the plurality of optical fiber retention holes, the plurality of optical fiber retention holes being configured to individually retain the plurality of optical fibers. The end face has openings for the plurality of optical fiber retention holes arranged along the second direction, and the plurality of optical fibers is fixed in a state in which tip end faces of the plurality of optical fibers are individually exposed on the openings for the plurality of optical fiber retention holes. The ferrule is stored in the housing in a state in which the ferrule is biased by the elastic member from the opposite side of the end face in the connecting direction, and the at least one tape fiber is inserted into the space of the elastic member in a noncircular shape.

An optical connector according to another aspect of the present disclosure includes the above-described elastic member, a round code having a plurality of optical fibers in a bundle, a ferrule configured to retain the plurality of optical fibers extending from the round code, and a housing configured to store the ferrule and the elastic member. The ferrule has an end face provided at one end of the connecting direction and has a plurality of optical fiber retention holes, the plurality of optical fibers being individually inserted into the plurality of optical fiber retention holes, the plurality of optical fiber retention holes being configured to individually retain the plurality of optical fibers. The end face has openings for the plurality of optical fiber retention holes, and the plurality of optical fibers extending from the round code is fixed in a state in which tip end faces of the plurality of optical fibers are individually exposed on the openings for the plurality of optical fiber retention holes. The ferrule is stored in the housing in a state in which the ferrule is biased by the elastic member from the opposite side of the end face in the connecting direction, and the round code is inserted into the space of the elastic member in a noncircular shape.

DESCRIPTION OF EMBODIMENTS

Technical Problem

Figure 9:
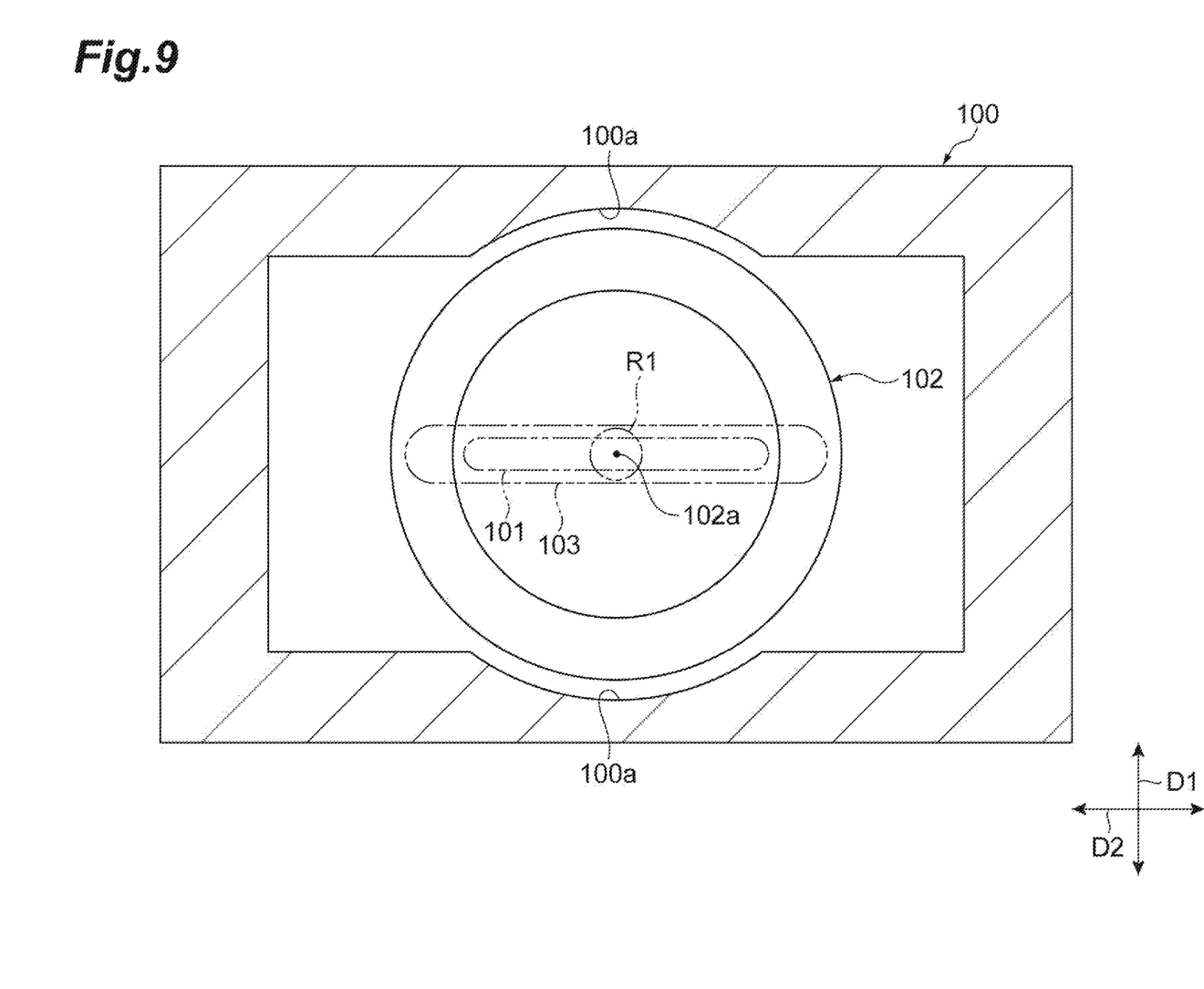
FIG. 9 is a diagram showing a conventional elastic member stored in the housing of an optical connector.

As described above, an optical fiber ribbon is passed through the inside of a spring that presses a ferrule. In the optical fiber ribbon, a plurality of optical fibers is bundled such that the plurality of optical fibers is arranged along one direction, and the width of the optical fiber ribbon is widened as the number of the optical fibers arranged along one direction is increased. As shown in FIG. 9, a spring 102 is stored in a housing 100, and is in a circular shape in a cross section intersecting with the connecting direction of an optical connector.

In the cross section intersecting with the connecting direction, the housing 100 is in a rectangular frame shape extending in a first direction D1 and a second direction D2, which intersect with the connecting direction, and extending long in the second direction D2. The housing 100 is provided with a pair of inner surfaces 100a in an arc shape opposite to each other along the first direction D1, between which a spring 102 enters. Conventionally, since an optical fiber ribbon 101 in a 12-fiber linear array is used, in which 12 optical fibers are arranged along the second direction D2, the optical fiber ribbon 101 has been passable through the inner side of the spring 102 in a circular shape.

However, in the MPO connector having the MT ferrule, an optical fiber ribbon 103 in a 16-fiber linear array is proposed in which 16 optical fibers are arranged along the second direction D2. The width of the optical fiber ribbon 103 in a 16-fiber linear array is wider than the width of the optical fiber ribbon 101 in a 12-fiber linear array, and it is assumed that the optical fiber ribbon 103 is not passable through the inner side of the spring 102. In the future, optical fiber ribbons in a 32-fiber parallel array and in a 64-fiber quad array are possibly proposed. Therefore, in the case in which the spring 102 in a circular shape is used, a problem possibly arises that it is not possible to handle an increase in the number of optical fibers.

Figure 10:
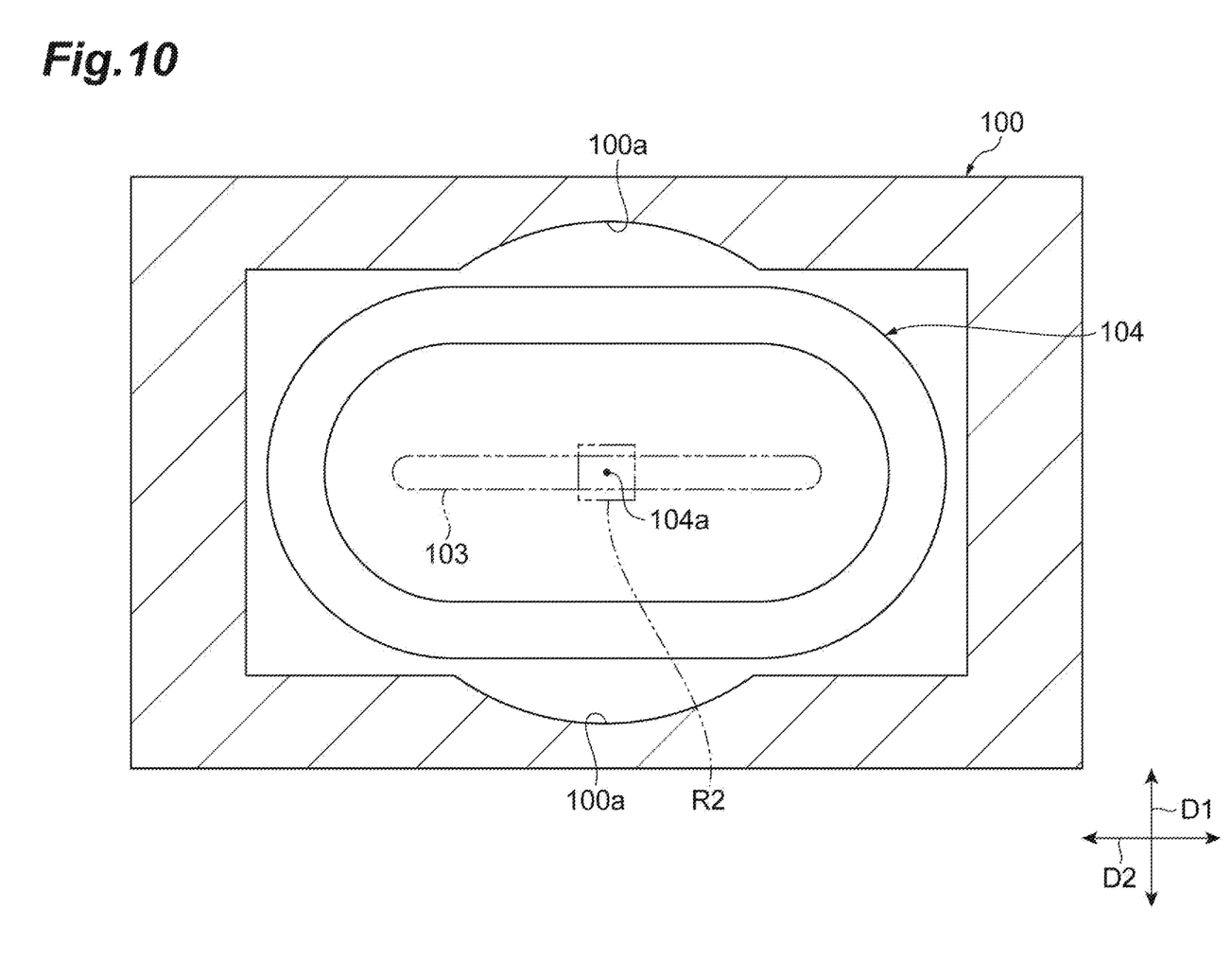
FIG. 10 is a diagram showing another conventional elastic member stored in the housing of an optical connector, the elastic member which is different from the elastic member shown in FIG. 9.

Therefore, as shown in FIG. 10, the use of a spring 104 in an elliptic shape in the cross section intersecting with the connecting direction of the optical connector is thought. In the case in which the spring 104 in an elliptic shape extending long in the second direction D2 is used in this manner, the optical fiber ribbon 103 in a 16-fiber linear array can be passed through the inner side of the spring 104. However, the spring 104 in an elliptic shape easily wobbles in both of the first direction D1 and the second direction D2 in the inside of the housing 100.

The spring 104 in an elliptic shape has a moving area wider than that of the spring 102 in a circular shape. In the cross section intersecting with the connecting direction of the optical connector, a moving area R1 of a center 102a of the spring 102 is in a circular shape, whereas a moving area R2 of a center 104a of the spring 104 is in a rectangular shape having its area greater than the moving area R1. Consequently, since the spring 104 in an elliptic shape has difficulty in stabilizing the position of the center 104a compared with the spring 102 in a circular shape, the spring 104 in an elliptic shape has a problem that the balance of pressing force to the ferrule is poor. In the case in which the balance of pressing force to the ferrule is poor, non-uniformity possibly occurs in the pressing force to the ferrule, leading to a concern that the optical properties are unstable.

An object of the present disclosure is to provide an elastic member and an optical connector that can handle an increase in the number of optical fibers and that can make the balance of pressing force to a ferrule excellent.

Advantageous Effects of the Present Disclosure

According to aspects of the present disclosure, an increase in the number of optical fibers can be handled, and the balance of pressing force to the ferrule can be made excellent.

DESCRIPTION OF EMBODIMENTS

First, the contents of embodiments of the present disclosure will be described in enumeration. An elastic member according to an embodiment is an elastic member configured to bias a ferrule retaining a plurality of optical fibers in a connecting direction. The elastic member is stored in a housing configured to accommodate the ferrule, the elastic member has a space in its inside into which a 16-fiber tape fiber is inserted, and the elastic member is in a noncircular shape in a cross section intersecting with the connecting direction. The elastic member includes a pair of first portions having an outer surface opposite to a pair of inner surfaces in an arc shape of the housing, the inner surfaces being opposite to each other along a first direction intersecting with the connecting direction, and a pair of second portions opposite to the tape fiber along a second direction intersecting with both of the connecting direction and the first direction.

An optical connector according to the embodiment includes the above-described elastic member, at least one tape fiber, a ferrule configured to retain a plurality of optical fibers extending from the tape fiber, and a housing configured to store the ferrule and the elastic member. The ferrule has an end face provided at one end of the connecting direction and has a plurality of optical fiber retention holes, the plurality of optical fibers being individually inserted into the plurality of optical fiber retention holes, the plurality of optical fiber retention holes being configured to individually retain the plurality of optical fibers. The end face has openings for the plurality of optical fiber retention holes arranged along the second direction, and the plurality of optical fibers is fixed in a state in which tip end faces of the plurality of optical fibers are individually exposed on the openings for the plurality of optical fiber retention holes. The ferrule is stored in the housing in a state in which the ferrule is biased by the elastic member from the opposite side of the end face in the connecting direction, and the at least one tape fiber is inserted into the space of the elastic member in a noncircular shape.

In this elastic member and this optical connector, the elastic member configured to bias the ferrule in the connecting direction of the optical connector has the space in its inside into which a 16-fiber tape fiber is inserted. The elastic member is in a noncircular shape in the cross section intersecting with the connecting direction. Therefore, a tape fiber in a 16-fiber linear array can be passed through the space in the inside of the elastic member in a noncircular shape, and thus an increase in optical fibers can be handled. The elastic member includes the pair of first portions having the outer surface opposite to the pair of inner surfaces of the housing in an arc shape. Consequently, the first portions individually opposite to the inner surfaces of the housing in an arc shape are included in a pair in the first direction, and thus the elastic member is stored in the internal space of the housing in the state in which the first portions individually enter the inner surfaces of the housing. As a result, the wobbles of the elastic member in the internal space of the housing are suppressed, and the position of the elastic member can be stabilized in the internal space of the housing. Accordingly, the balance of pressing force to the ferrule by the elastic member can be made excellent, and the optical properties of the optical connector can be stabilized with the non-uniformity of pressing force to the ferrule suppressed.

The above-described elastic member may be a compressed coil spring in which a wire extends in a spiral shape along the connecting direction. In this case, the manufacture of the elastic member can be facilitated, and the ferrule can be stably pressed in the connecting direction by the elastic member in a spiral shape.

The above-described elastic member may be in a diamond shape with four rounded corners in the cross section intersecting with the connecting direction. In this case, the elastic member can be formed in a simple shape, and the elastic member can be formed in a less angular shape. As a result, the manufacturability of the elastic member can be improved, and the breakage of the elastic member can be more reliably suppressed. Accordingly, the durability of the elastic member can be improved.

In the cross section intersecting with the connecting direction, the above-described elastic member may have a first linear part located on both sides of the first portion in the second direction and extending in the second direction along the inner surface of the housing. In this case, the first linear part opposite to the inner surface of the housing is included on both sides of the first portion in the second direction, and thus the wobbles of the elastic member in the internal space of the housing can be more reliably suppressed. Accordingly, the ferrule can be pressed stably in a more excellent balance by the elastic member.

In the above-described elastic member, the pair of second portions may individually have a second linear part extending in the first direction along the inner surface of the housing. In this case, at the second portion located on both sides of the tape fiber in the second direction, the second linear part extending in the first direction along the inner surface of the housing is provided. Consequently, the second portion has the second linear part opposite to the inner surface of the housing, and thus the wobbles of the elastic member in the internal space of the housing can be more reliably suppressed. As a result, the balance of pressing force to the ferrule can be made more excellent.

In the above-described elastic member, the wire may be made of a metal. In this case, a desired pressing force to the ferrule can be achieved with no increase in the size of the elastic member.

Accordingly, this contributes to a reduction in the size of the elastic member and the optical connector.

In the above-described elastic member, the wire may be made of SUS (Steel Use Stainless). In this case, the wire of the elastic member can be a wire that is versatile and easily available. Accordingly, the elastic member and the optical connector can be easily manufactured.

In the above-described elastic member, end-part polishing is not necessarily applied to the wire. In this case, the process of applying end-part polishing to the wire can be omitted, and thus the manufacture of the elastic member and the optical connector can be further facilitated. Even though end-part polishing is not applied to the wire, the first portions that individually enter the inner surfaces of the housing in an arc shape are included as described above, and thus the position of the elastic member can be stabilized in the internal space of the housing. Accordingly, the balance of pressing force to the ferrule by the elastic member can be made excellent, and the optical properties of the optical connector can be stabilized with the non-uniformity of pressing force suppressed.

An optical connector according to another embodiment includes the above-described elastic member, a round code having a plurality of optical fibers in a bundle, a ferrule configured to retain the plurality of optical fibers extending from the round code, and a housing configured to store the ferrule and the elastic member. The ferrule has an end face provided at one end of the connecting direction and has a plurality of optical fiber retention holes, the plurality of optical fibers being individually inserted into the plurality of optical fiber retention holes, the plurality of optical fiber retention holes being configured to individually retain the plurality of optical fibers. The end face has openings for the plurality of optical fiber retention holes, and the plurality of optical fibers extending from the round code is fixed in a state in which tip end faces of the plurality of optical fibers are individually exposed on the openings for a plurality of the optical fiber retention holes. The ferrule is stored in the housing in a state in which the ferrule is biased by the elastic member from an opposite side of the end face in the connecting direction, and the round code is inserted into the space of the elastic member in a noncircular shape.

In this optical connector, the round code is inserted into the space in the inside of the elastic member configured to bias the ferrule in the connecting direction of the optical connector, and the elastic member is in a noncircular shape in the cross section intersecting with the connecting direction. Accordingly, the round code can be passed through the space in the inside of the elastic member in a noncircular shape. The elastic member includes the pair of first portions having the outer surface opposite to the pair of inner surfaces of the housing in an arc shape. Consequently, the first portion opposite to the inner surfaces of the housing in an arc shape is provided in a pair in the first direction, and thus the elastic member is stored in the housing in the state in which the first portions individually enter the inner surfaces of the housing. Accordingly, similarly to the description above, the balance of pressing force to the ferrule by the elastic member can be made excellent, and the optical properties can be stabilized with the non-uniformity of pressing force to the ferrule suppressed.

DETAILS OF EMBODIMENTS

In the following, specific examples of an elastic member and an optical connector according to embodiments of the present disclosure will be described with reference to the drawings. Note that the present invention is not limited to exemplifications below, and intends to include all modifications described in claims and in the scope equivalent to the scope of claims. In the following, in the description of the drawings, the same or corresponding components are designated with the same reference signs, and the duplicate description is appropriately omitted. For easy understanding in the drawings, some parts are sometimes simplified or exaggerated, and dimensions, ratios, and any other parameters are not limited to those described in the drawings.

First Embodiment

Figure 1:
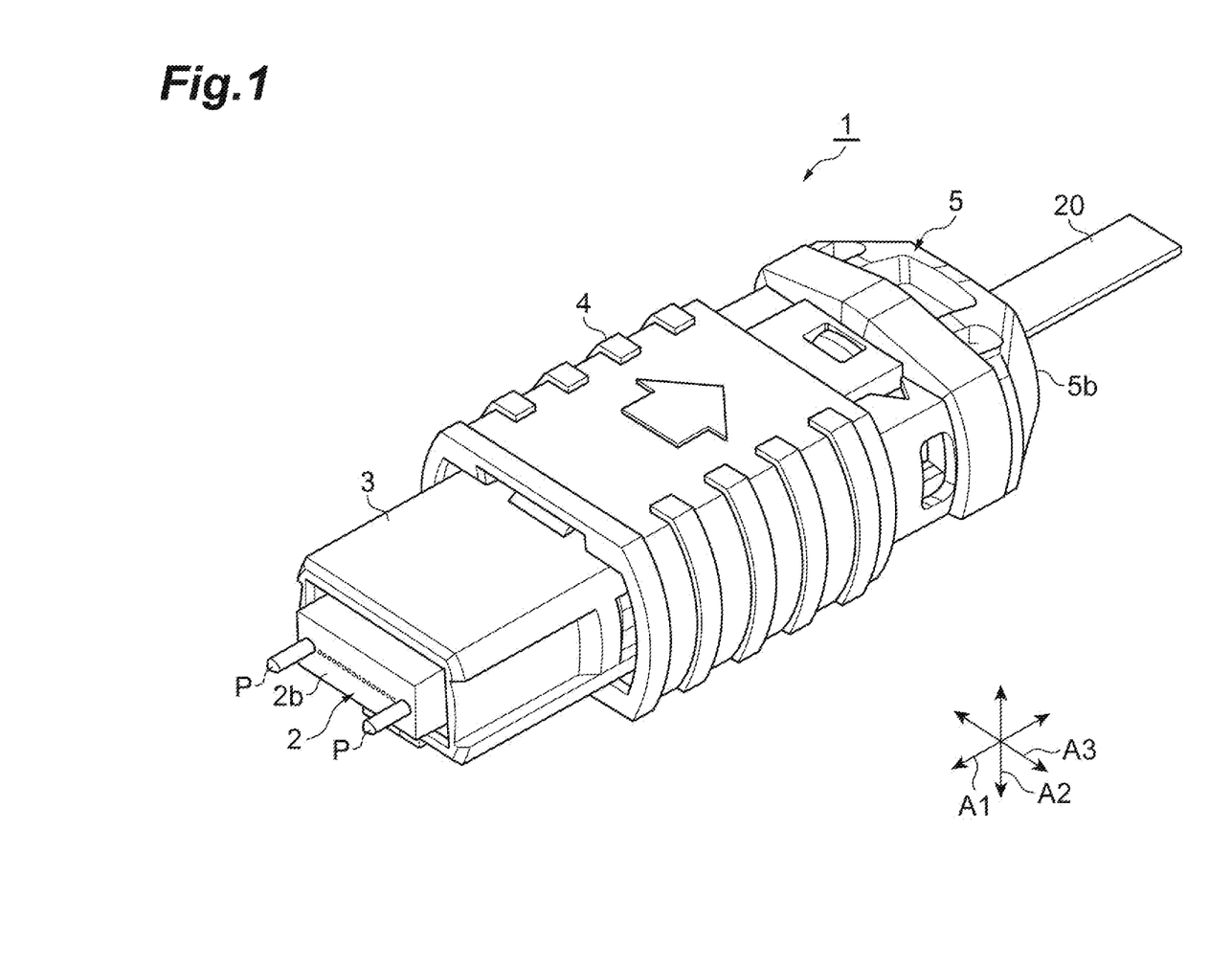
FIG. 1 is a perspective view showing an optical connector according to a first embodiment.
Figure 2:
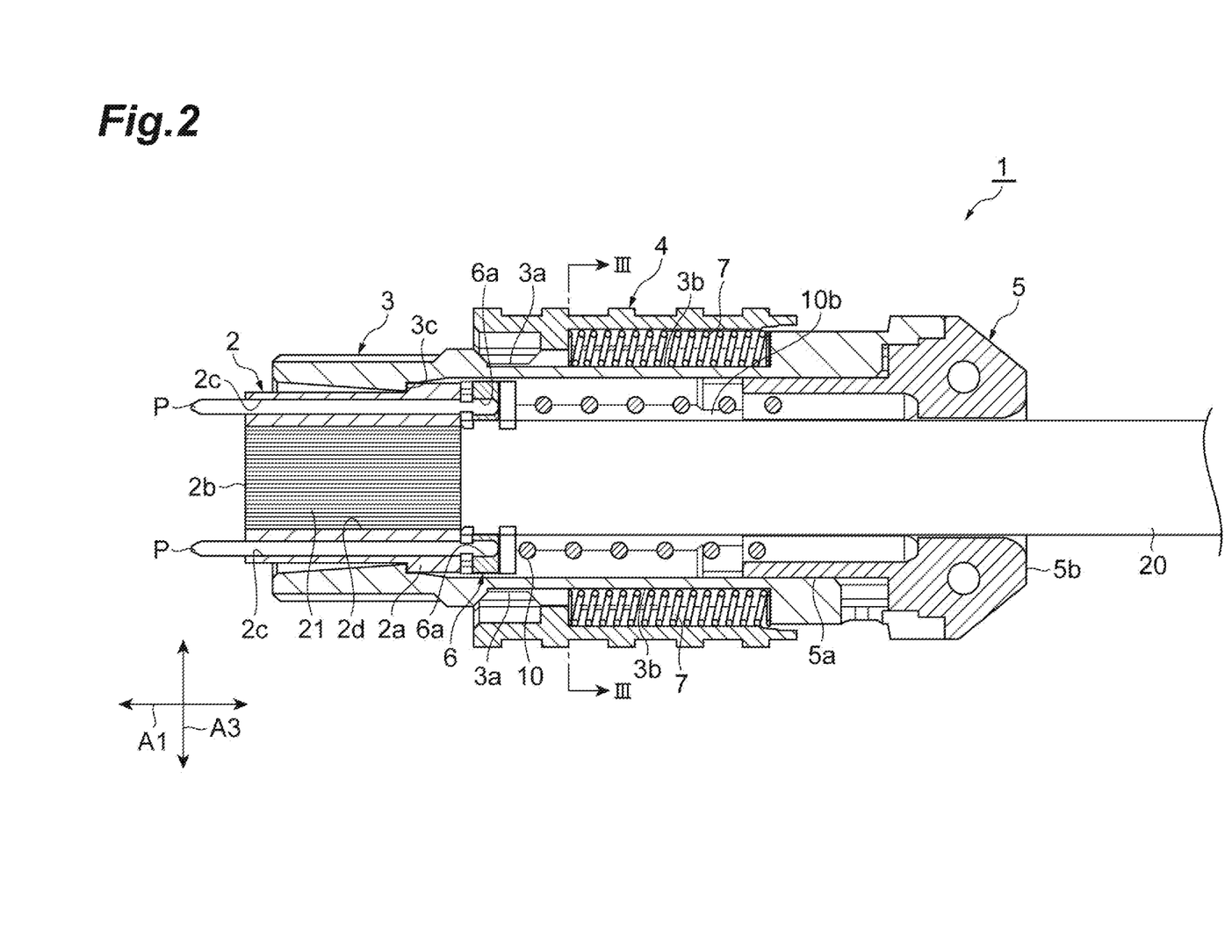
FIG. 2 is a cross sectional view showing the optical connector in FIG. 1.

FIG. 1 is a perspective view showing an optical connector according to a first embodiment. FIG. 2 is a longitudinal sectional view of the optical connector in FIG. 1. The optical connector 1 according to the first embodiment is an MPO connector, for example, and is an optical connector connected to an external optical connector. As shown in FIGS. 1 and 2, the optical connector 1 includes a ferrule 2 located at one end of the optical connector 1 in a connecting direction A1, an inner housing 3 (housing) that covers the ferrule 2, an outer housing 4 that covers a part of the inner housing 3, and a rear housing 5 connected to the inner housing 3. In the inside of the optical connector 1, a pin keeper 6 and an elastic member 10 that is a ferrule spring which biases the ferrule 2 are provided.

In the following, for convenience of explanation, description is sometimes made in which directions are determined as "front" and "rear". In the connecting direction A1 described above, a direction in which the ferrule 2 is viewed from the rear housing 5 is defined as the front side, and the opposite direction is defined as the rear side. A direction that intersects with the connecting direction A1 and that is the short direction of an end face 2b of the ferrule 2 is defined as a first direction A2, and a direction that intersects with the connecting direction A1 and that is the long direction of the end face 2b of the ferrule 2 is defined as a second direction A3. These directions are simply provided for convenience of explanation, which do not limit the scope of the present invention.

The ferrule 2 is in a box shape having an enlarged part 2a on the rear side. In the inside of the ferrule 2, a plurality of optical fiber retention holes 2d extending in the connecting direction A1 is formed. Into the optical fiber retention holes 2d, optical fibers 21 are individually inserted, the optical fibers 21 constituting a tape fiber 20 that is inserted from the rear housing 5 into the inside of the inner housing 3. The front end of the enlarged part 2a of the ferrule 2 is an abutting surface abutting on the inner housing 3.

On the end face 2b of the ferrule 2, the ferrule of a counterpart connector, which is connected to the optical connector 1, abuts in the connecting direction A1. The ferrule 2 has a pair of guide holes 2c into which a guide pin P is inserted. The guide pin P and the guide holes 2c function as positioning parts that position the counterpart connector with the optical connector 1. Two guide holes 2c are placed side by side in the second direction A3.

Between the ferrule 2 and the rear housing 5, the elastic member 10 that biases the ferrule 2 forward and the pin keeper 6 that retains the guide pin P inserted into the guide holes 2c of the ferrule 2 from the front side are provided. The pin keeper 6 is accommodated in the inside of the inner housing 3, and provided between the ferrule 2 and the elastic member 10. The pin keeper 6 has a pair of retention holes 6a that retain the guide pin P, and the pair of retention holes 6a are provided such that the pair of retention holes 6a are arranged in the second direction A3.

The inner housing 3 is in a stepped square tubular shape with an enlarged part on the rear side. On the outer surface of the inner housing 3, a pair of engagement holes 3a with which the latch of an external optical adapter for the optical connector 1 engages and a groove 3b that accommodates a coil spring 7 which biases the outer housing 4 on the front side are provided. The engagement holes 3a are provided on the surface of the inner housing 3. The engagement hole 3a is formed in a trapezoid shape on the outer surface of the inner housing 3, for example. Fitting the latch of the optical adapter into the engagement holes 3a causes the optical connector 1 to engage with the optical adapter in the connecting direction A1, and thus the optical connector 1 is mounted on the optical adapter. The groove 3b extends in the connecting direction A1, and in the groove 3b, the coil spring 7 extendable in the connecting direction A1 is accommodated.

In the inside of the inner housing 3, the ferrule 2 and a part of the rear housing 5 are accommodated. The inner surface of the inner housing 3 has a stepped shape, and on the inner side of the inner housing 3, an abutting surface 3c on which the ferrule 2 abuts along the connecting direction A1 is provided. On the abutting surface 3c, the front surface of the enlarged part 2a of the ferrule 2, which is biased on the front side by the elastic member 10, abuts. The outer housing 4 is attached movably in the connecting direction A1 on the outer side of the inner housing 3. The outer housing 4 shows a tubular shape, and the cross section of the outer housing 4 is in a curved shape such that the short side of a rectangle bulges on the outer side. In the outer housing 4, a part of the inner housing 3 and the coil spring 7 are accommodated.

The rear housing 5 includes a tubular insertion part 5a that is inserted into the inner housing 3 and a tubular exposed part 5b that is provided on the rear side of the insertion part 5a. The rear housing 5 engages with the inner housing 3 in a state in which the front end of the insertion part 5a abuts on the inner housing 3 along the connecting direction A1. In the inside of the insertion part 5a and the exposed part 5b, the tape fiber 20 composed of a bundle of a plurality of optical fibers 21 is inserted, and the tape fiber 20 is retained.

Figure 3:
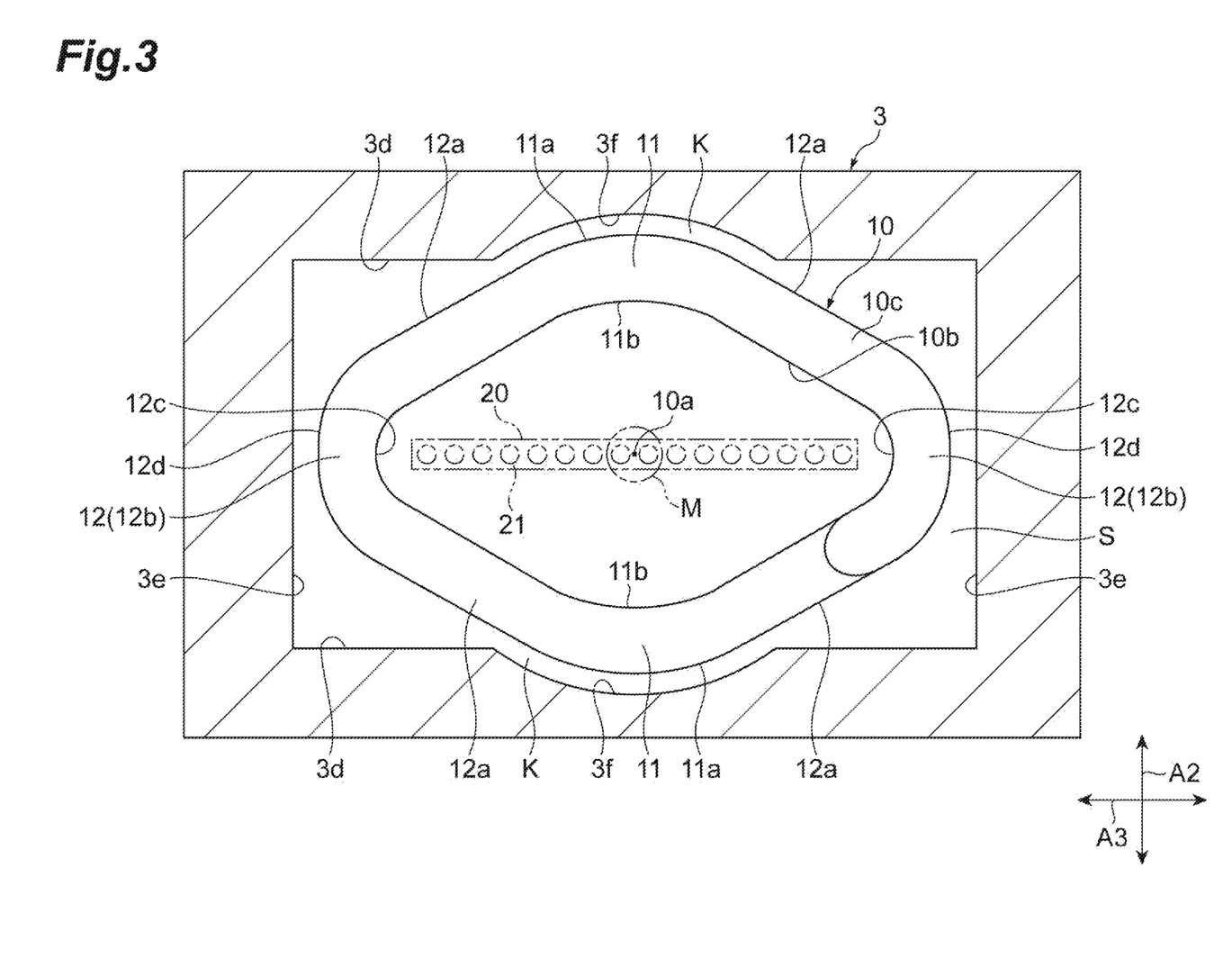
FIG. 3 is a cross sectional view showing an elastic member stored in a housing of the optical connector in FIG. 1 and the housing.

FIG. 3 is a cross sectional view of the elastic member 10 and the inner housing 3 in FIG. 2 taken along line III-III. As shown in FIGS. 2 and 3, the tape fiber 20 is inserted into the rear housing 5 and the elastic member 10 from the rear side, and further inserted into the ferrule 2. The tape fiber 20 is a 16-fiber optical fiber ribbon, for example, and 16 optical fibers 21 are arranged along the second direction A3. The example in FIG. 3 shows a state in which 16 optical fibers 21 are arranged in a row along the second direction A3.

However, two sets of eight optical fibers 21 arranged along the second direction A3 (e.g. an eight-fiber optical fiber ribbon) may be provided along the second direction A3, or a set of 16 optical fibers 21 arranged along the second direction A3 may be provided in a multiple array along the first direction A2. As described above, the array of the optical fibers 21 of the tape fiber 20 is appropriately changeable. The number of the tape fibers 20 may be one, or may be plural numbers, which is appropriately changeable.

The elastic member 10 has a space 10b in its inside into which the tape fiber 20 is inserted. The space 10b penetrates through the elastic member 10 in the connecting direction A1, and the tape fiber 20 inserted into the space 10b extends along the connecting direction A1.

The elastic member 10 is a compressed coil spring in a spiral shape extending along the connecting direction A1, for example. A wire 10c of the elastic member 10 is made of a metal, and is made of SUS, for example. As an example, the material of the wire 10c is SUS 304. The wire 10c is in a spiral shape gradually extending in the connecting direction A1, circling around in the first direction A2 and the second direction A3. Therefore, the wire 10c has a plurality of pitches along the connecting direction A1. The cross section of the wire 10c cut in the plane orthogonal to the long direction of the wire 10c (the direction in which the wire 10c extends) is in a circular shape. For example, the diameter of the wire 10c is 0.6 mm or more and 0.7 mm or less.

For example, end-part polishing is not applied to the end part of the elastic member 10 on the ferrule 2 side. The term "end-part polishing" means polishing that is applied to the end part of the elastic member 10 in the connecting direction A1 such that the end part has a flat surface. In the conventional elastic member, when end-part polishing is not applied to the end part of the elastic member in the connecting direction, the application of pressing force to the ferrule in a good balance fails, resulting in a possible influence over the optical properties of the optical connector. However, in the elastic member 10 and the optical connector 1 according to the present embodiment, the balance of pressing force of the elastic member 10 to the ferrule 2 can be made excellent with no application of end-part polishing to the end part of the elastic member 10. Note that in order to further make the balance of pressing force to the ferrule 2 excellent, end-part polishing may be applied to the end part of the elastic member 10.

Figure 4:
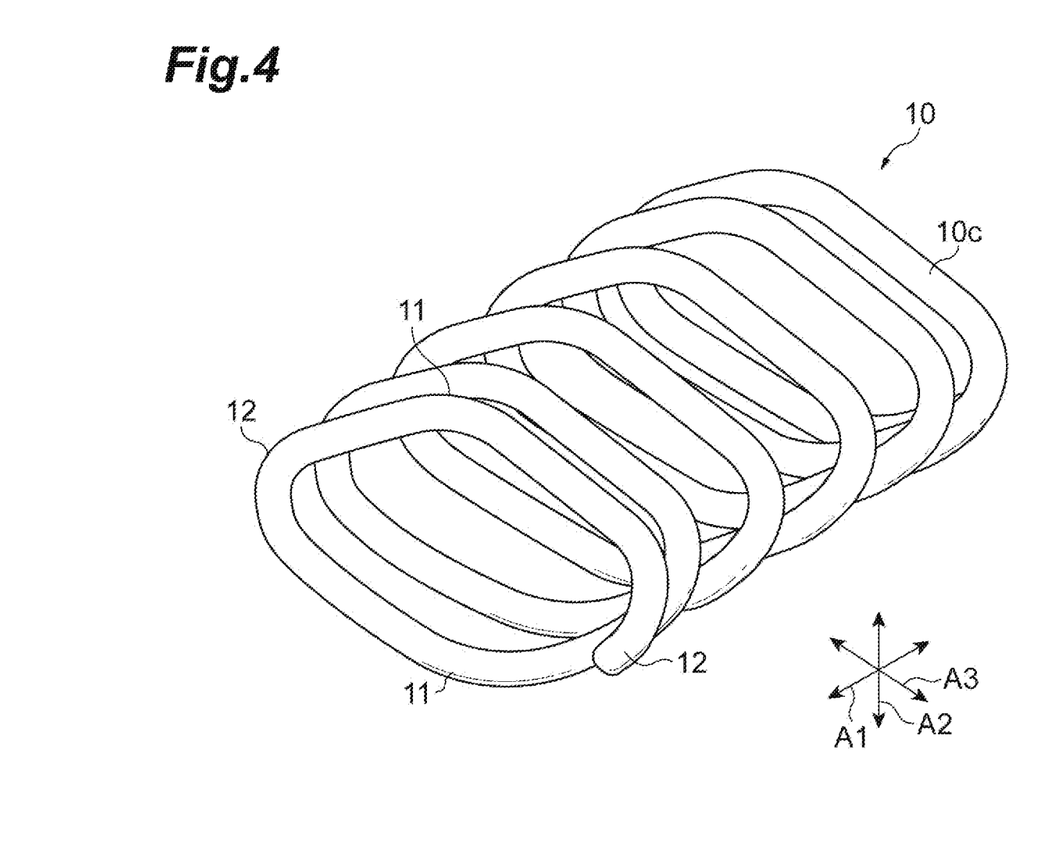
FIG. 4 is a perspective view showing the elastic member in FIG. 3.

FIG. 4 is a perspective view showing the elastic member 10. As shown in FIGS. 3 and 4, the elastic member 10 that biases the ferrule 2 is stored in an internal space S of the inner housing 3 together with the ferrule 2. The elastic member 10 is in a noncircular shape in a cross section intersecting with the connecting direction A1 (in a plane extending along the first direction A2 and the second direction A3). In the cross section, the elastic member 10 is in a diamond shape having four rounded corners. The elastic member 10 has a pair of first portions 11 located on both sides in the first direction A2 and a pair of second portions 12 located on both sides in the second direction A3.

The internal space S of the inner housing 3, in which the ferrule 2 and the elastic member 10 are stored, is in a rectangular shape extending long in the second direction A3, for example, in the cross section intersecting with the connecting direction A1. The inner housing 3 has a pair of first inner surfaces 3d (inner surfaces) extending in the second direction A3 and a pair of second inner surfaces 3e (inner surfaces) extending in the first direction A2. The internal space S of the inner housing 3 is defined by the first inner surfaces 3d and the second inner surfaces 3e. The length of the internal space S in the second direction A3 (the distance between the pair of second inner surfaces 3e) is 7.5 mm, for example.

The second inner surface 3e of the inner housing 3 is in a flat shape, for example. The first inner surface 3d of the inner housing 3 includes an inner surface 3f into which the first portions 11 of the elastic member 10 enter. The inner surface 3f is provided in the center of the first inner surface 3d in the second direction A3, for example. In the cross section intersecting with the connecting direction A1, the inner surface 3f is in an arc shape. Into the inner surfaces 3f of the inner housing 3, the elastic member 10 according to the present embodiment as well as the conventional elastic member (e.g. the spring 102 in FIG. 9) in a circular shape in the cross section intersecting with the connecting direction A1 can enter. That is, as the inner housing 3 having the pair of inner surfaces 3f in an arc shape, conventional ones can be shared.

The first portion 11 has an outer surface 11a along the inner surface 3f of the inner housing 3 and an inner surface 11b directed on the opposite side of the inner surface 3f. The outer surface 11a is in an arc shape along the inner surface 3f, and the radius of curvature of the outer surface 11a is almost the same as the radius of curvature of the inner surface 3f, for example. The inner surface 11b is in an arc shape similar to the outer surface 11a, for example, and the thickness of the first portion 11 is constant. However, the shape of the inner surface 11b is not necessarily the same as the outer surface 11a, and is appropriately changeable.

As described above, the first portion 11 has the outer surface 11a in an arc shape, the outer surface 11a enters the inner surface 3f of the inner housing 3, and thus the movements in the first direction A2 and the second direction A3 are regulated. Note that between the outer surface 11a of the first portion 11 and the inner surface 3f of the inner housing 3, a gap K is formed, and the elastic member 10 is slightly moved to the inner housing 3 due to this gap K. FIG. 3 shows a moving area M of a center 10a of the elastic member 10 in the cross section intersecting with the connecting direction A1. The moving area M is in a circular shape. The area of the moving area M of the elastic member 10 may be similar to the area of the moving area (the moving area R1 in FIG. 9) of the conventional elastic member in a circular shape in a cross section.

The second portion 12 is in a shape projecting from the first portions 11 in the second direction A3. That is, the second portion 12 projects on both end sides in the second direction A3 from the extending portions of the first portions 11. The second portion 12 has inclination parts 12a inclined from the first portions 11 in both of the first direction A2 and the second direction A3 and opposed parts 12b opposed to the tape fiber 20 at the end parts of the inclination parts 12a on the opposite side of the first portion 11. The inclination part 12a is provided in a pair on both sides of the first portions 11 in the second direction A3. The opposed part 12b is provided between a pair of inclination parts 12a arranged along the first direction A2, and the tape fiber 20 is inserted between a pair of opposed parts 12b arranged along the second direction A3.

As described above, the length of the internal space S in the second direction A3 is 7.5 mm, for example, and the width of the tape fiber 20 in the second direction A3 is 4.2 mm. Consequently, when the diameter of the wire 10c of the elastic member 10 is 0.7 mm, the distance (the length between a pair of inner surfaces 12c) between the pair of second portions 12 (the opposed parts 12b) is longer than 4.2 mm and 6.1 mm (7.5−0.7×2 (mm)) or less, for example. The inclination parts 12a extend linearly, for example, and the opposed parts 12b curve in an arc shape between the end parts of the inclination parts 12a. The opposed part 12b has the inner surface 12c opposite to the tape fiber 20 and an outer surface 12d opposite to the second inner surface 3e of the inner housing 3. The thicknesses of the elastic member 10 at the inclination part 12a and the opposed part 12b are the same, for example.

Next, operations and effects obtained from the elastic member 10 and the optical connector 1 according to the present embodiment will be described. In the elastic member 10 and the optical connector 1, the elastic member 10 that biases the ferrule 2 in the connecting direction A1 of the optical connector 1 has the space 10b in its inside, into which the 16-fiber tape fiber 20 is inserted. The elastic member 10 is in a noncircular shape in the cross section intersecting with the connecting direction A1. Accordingly, the tape fiber 20 in a 16-fiber linear array can be passed through the space 10b in the inside of the elastic member 10 in a noncircular shape, and thus an increase in the optical fibers 21 can be handled.

The elastic member 10 includes the pair of first portions 11 having the outer surface 11a opposite to the pair of inner surfaces 3f of the inner housing 3 in an arc shape. Consequently, the first portions 11 opposite to the inner surfaces 3f of the inner housing 3 in an arc shape are provided in a pair in the first direction A2, and thus the elastic member 10 is stored in the internal space S of the inner housing 3 in a state in which the first portions 11 individually enter the inner surfaces 3f of the inner housing 3. As a result, the wobbles of the elastic member 10 in the internal space S of the inner housing 3 are suppressed, and thus the position of the elastic member 10 can be stabilized in the internal space S of the inner housing 3. Accordingly, the balance of pressing force to the ferrule 2 by the elastic member 10 can be made excellent, and the optical properties of the optical connector 1 can be stabilized with the non-uniformity of pressing force to the ferrule 2 suppressed.

The elastic member 10 is a compressed coil spring in which the wire 10c extends in a spiral shape along the connecting direction A1. Accordingly, the manufacture of the elastic member 10 can be facilitated, and the elastic member 10 in a spiral shape can stably press the ferrule 2 in the connecting direction A1.

The elastic member 10 is in a diamond shape having four rounded corners in the cross section intersecting with the connecting direction A1. Consequently, the elastic member 10 can be formed in a simple shape, and the elastic member 10 can be formed in a less angular shape. As a result, the manufacturability of the elastic member 10 can be improved, and the breakage of the elastic member 10 can be more reliably suppressed. Accordingly, the durability of the elastic member 10 can be improved.

In the elastic member 10, the wire 10c is made of a metal. Consequently, a desired pressing force to the ferrule 2 can be achieved with no increase in the size of the elastic member 10. Accordingly, this contributes to a reduction in the size of the elastic member 10 and the optical connector 1.

In the elastic member 10, the wire 10c is made of SUS. Consequently, the wire 10c of the elastic member 10 can be a wire that is versatile and easily available. Accordingly, the elastic member 10 and the optical connector 1 can be easily manufactured.

In the elastic member 10, end-part polishing is not applied to the wire 10c. Consequently, the process of applying end-part polishing to the wire 10c can be omitted, and thus the manufacture of the elastic member 10 and the optical connector 1 can be further facilitated. Even though end-part polishing is not applied to the wire 10c, the first portions 11 that individually enter the inner surfaces 3f of the inner housing 3 in an arc shape are included as described above, and thus the position of the elastic member 10 can be stabilized in the internal space S of the inner housing 3. Accordingly, the balance of pressing force to the ferrule 2 by the elastic member 10 can be made excellent, and the optical properties of the optical connector 1 can be stabilized with the non-uniformity of pressing force suppressed.

Second Embodiment

Figure 5:
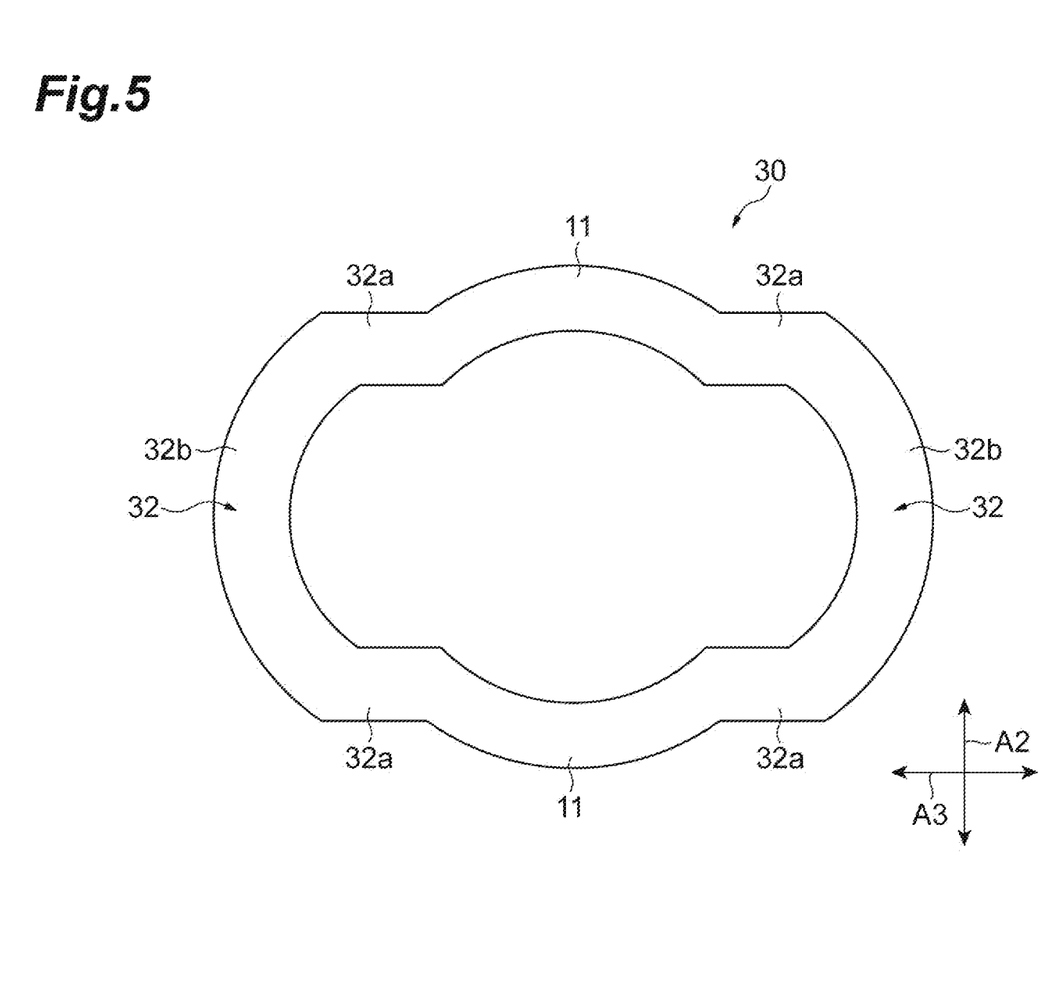
FIG. 5 is a diagram showing an elastic member according to a second embodiment.

Next, an elastic member 30 according to a second embodiment will be described with reference to FIG. 5. FIG. 5 is a diagram of the elastic member 30 viewed along the connecting direction A1. Note that in FIG. 5 and subsequent FIG. 6, an inner housing 3 is omitted in the drawings. However, the inner housing 3 is present on the outer side of the elastic member similarly in FIG. 3. The elastic member 30 according to the second embodiment includes first portions 11 and second portions 32, and the configuration of the second portion 32 is different from the second portion 12 of the first embodiment. In the following description, the duplicate description with the first embodiment is appropriately omitted.

The second portion 32 has a linear part 32a (first linear part) extending from the end parts of the first portions 11 along the second direction A3 and an opposed part 32b opposite to a tape fiber 20 at the end part of the linear part 32a on the opposite side of the first portion 11. The linear part 32a is provided in a pair on both sides of the first portions 11 in the second direction A3. The linear parts 32a are straight parts linearly extending along a first inner surface 3d of the inner housing 3, extending in parallel with the first inner surface 3d, for example. The opposed part 32b extends in a curve on the outer side of the elastic member 30 between the end parts of a pair of linear parts 32a arranged along the first direction A2. The opposed parts 32b curve in an arc shape, for example.

As described above, the elastic member 30 according to the second embodiment has the linear part 32a located on both sides of the first portion 11 in the second direction A3 and extending along the first inner surface 3d of the inner housing 3 in the second direction A3, in the cross section intersecting with the connecting direction A1. Consequently, the linear part 32a opposite to the first inner surface 3d of the inner housing 3 is included on both sides of the first portion 11 in the second direction A3, and thus the wobbles of the elastic member 30 in the first direction A2 can be suppressed. Accordingly, the wobbles of the elastic member 30 in an internal space S of the inner housing 3 can be more reliably suppressed. As a result, the ferrule 2 can be pressed stably in a more excellent balance by the elastic member 30.

Third Embodiment

Figure 6:
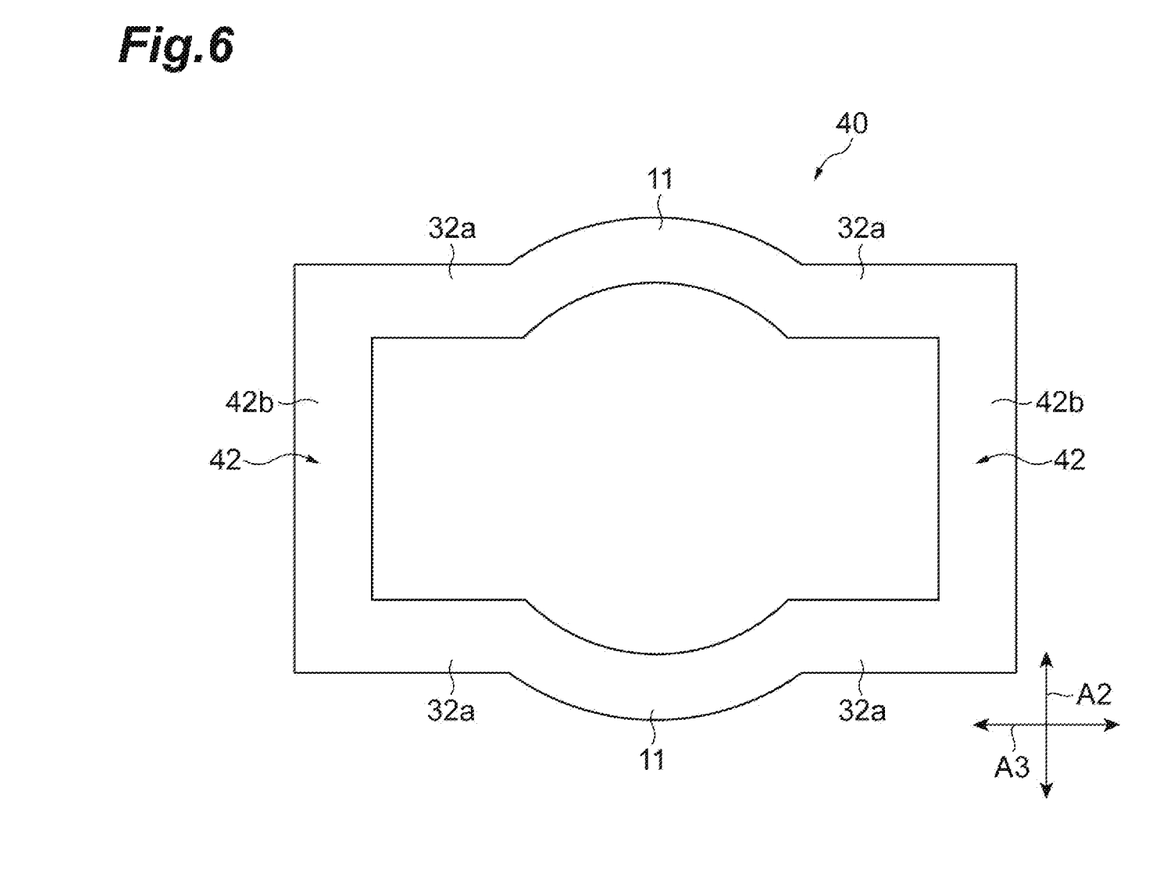
FIG. 6 is a diagram showing an elastic member according to a third embodiment.

Subsequently, an elastic member 40 according to a third embodiment will be described with reference to FIG. 6. FIG. 6 is a diagram of the elastic member 40 viewed along the connecting direction A1. The elastic member 40 according to the third embodiment includes first portions 11 and second portions 42, and a part of the second portion 42 is different from the second portion 32 of the second embodiment.

The second portion 42 has a linear part 32a extending from the end parts of the first portions 11 along the second direction A3 and a linear part 42b extending along the first direction A2 at the end part of the linear part 32a on the opposite side of the first portion 11. The linear part 42b is a straight part linearly extending in the first direction A2 between the end parts of a pair of linear parts 32a arranged along the first direction A2, and the linear part 42b extends along a second inner surface 3e of an inner housing 3. For example, the linear parts 42b extend in parallel with the second inner surface 3e.

As described above, in the elastic member 40 according to the third embodiment, a pair of second portions 42 have the linear part 42b extending in the first direction A2 along the second inner surface 3e of the inner housing 3. Therefore, at the second portion 42 located on both sides of the tape fiber 20 in the second direction A3, the linear part 42b extending in the first direction A2 along the second inner surface 3e of the inner housing 3 is provided. Consequently, the second portion 42 has the linear part 42b opposite to the second inner surface 3e of the inner housing 3, and thus the wobbles of the elastic member 40 in the second direction A3 can be suppressed. Accordingly, the wobbles of the elastic member 40 in an internal space S of the inner housing 3 can be more reliably suppressed. As a result, the balance of pressing force to the ferrule 2 can be made more excellent.

Fourth Embodiment

Figure 7:
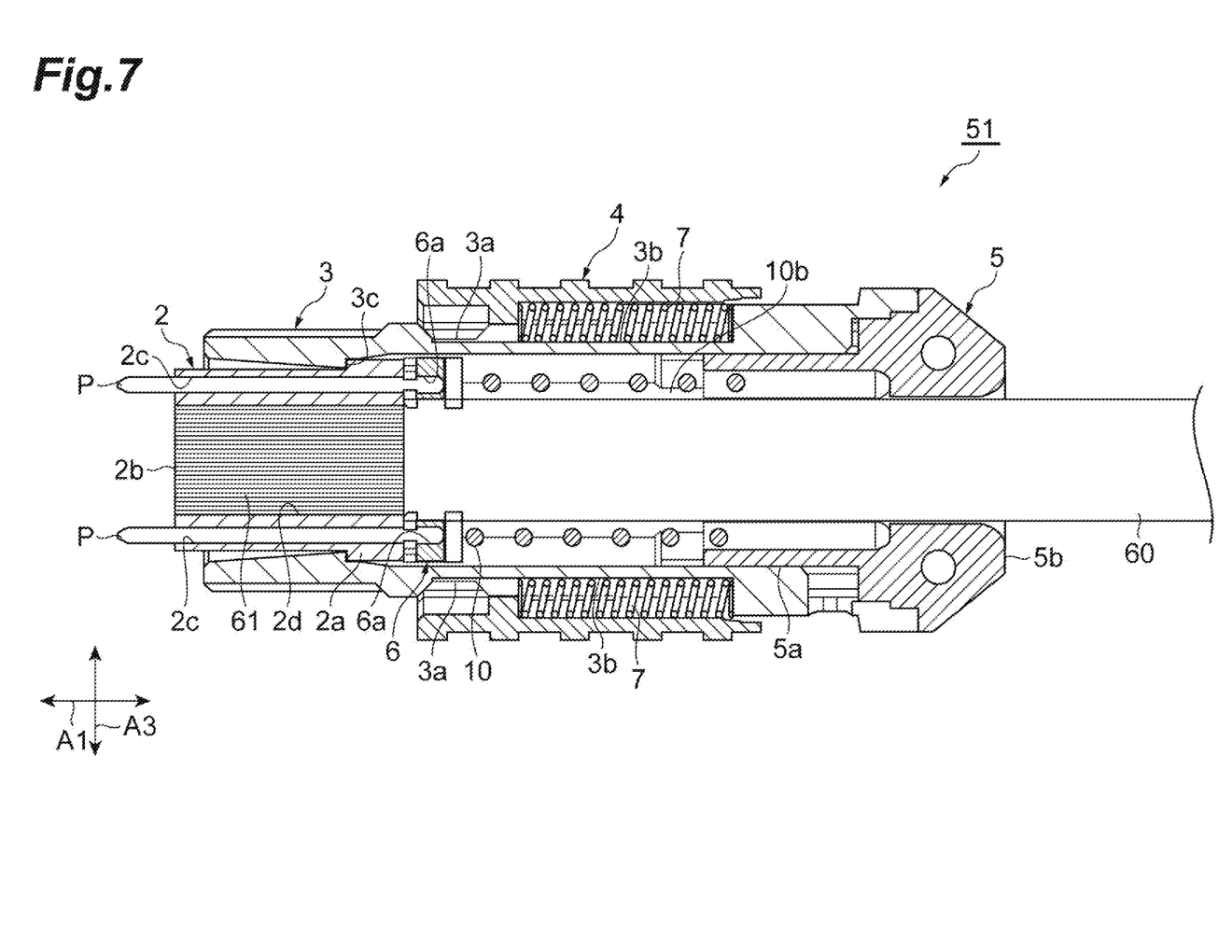
FIG. 7 is a cross sectional view showing an optical connector according to a fourth embodiment.
Figure 8:
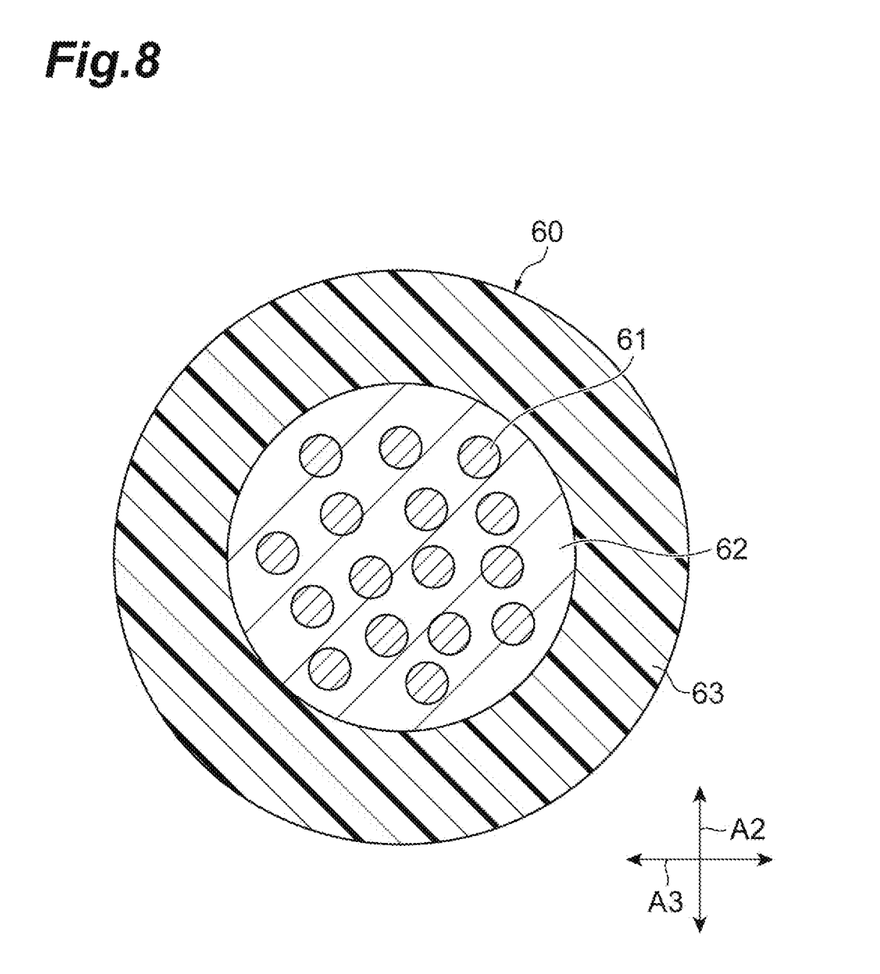
FIG. 8 is a cross sectional view showing the round code of the optical connector in FIG. 7.

Next, an optical connector 51 according to a fourth embodiment will be described with reference to FIGS. 7 and 8. As shown in FIGS. 7 and 8, the optical connector 51 is different from the first embodiment that a round code 60 is included instead of the tape fiber 20. In the inside of an insertion part 5a and an exposed part 5b of a rear housing 5 in the optical connector 51, the round code 60 composed of a plurality of optical fibers 61 is inserted, and the round code 60 is retained.

FIG. 8 is a cross sectional view showing the round code 60 cut on a plane intersecting with the connecting direction A1. In the round code 60, the plurality of optical fibers 61 is bundled, and a ferrule 2 retains the plurality of optical fibers 61 extending from the round code 60. The round code 60 is inserted into a space 10b of an elastic member 10 in a noncircular shape. For example, the round code 60 includes 16 optical fibers 61 that are wires, a tensile strength fiber 62 that covers the 16 optical fibers 61, and a sheath 63 that covers the tensile strength fiber 62. The round code 60 is an optical code in a diameter of 250 µm, for example, including 16 fibers of the optical fibers 61 in its inside. The sheath 63 is made of flame resistant PVC (polyvinyl alcohol), as an example.

As described above, in the optical connector 51 according to the fourth embodiment, the round code 60 is inserted into the space 10*b* in the inside of the elastic member 10 that biases the ferrule 2 in the connecting direction A1 of the optical connector 51, and the elastic member 10 is in a noncircular shape in the cross section intersecting with the connecting direction A1. Accordingly, the round code 60 can be passed through the space 10*b* in the inside of the elastic member 10 in a noncircular shape, and also in this case, the effects similar to those of the foregoing embodiments can be obtained.

As described above, the elastic members and the optical connectors according to the embodiments are described. However, the elastic members and the optical connectors according to the present invention are not limited to the forging embodiments, which can be variously modified. That is, the configurations of the components of the elastic members and the optical connectors are appropriately changeable in the scope of the gist of claims. For example, in the foregoing embodiment, the optical connector 1 including the inner housing 3 and the outer housing 4 is described. However, the configuration of the housing that stores the ferrule and the elastic member is not limited to the inner housing 3 and the outer housing 4, which is appropriately changeable. For example, one or three or more housings may store the ferrule and the elastic member.

In the foregoing embodiment, the elastic member 10 in a diamond shape in the cross section intersecting with the connecting direction A1 is described. However, in the cross section intersecting with the connecting direction, the shape of the elastic member only has to include the first portion having the outer surface that enters the arc-shaped inner surface of the housing and the second portion opposite to the tape fiber, is appropriately changeable.

REFERENCE SIGNS LIST 1, 51 optical connector
2 ferrule
2*a* enlarged part
2*b* end face
2*c* guide hole
2*d* optical fiber retention hole
3 inner housing (housing)
3*a* engagement hole
3*b* groove
3*c* abutting surface
3*d* first inner surface (inner surface)
3*e* second inner surface (inner surface)
3*f* inner surface
4 outer housing (housing)
5 rear housing
6 pin keeper
6*a* retention hole
7 coil spring
10, 30, 40 elastic member
10*a* center
10*b* space
10*c* wire
first portion
11*a* outer surface
11*b* inner surface
12, 32, 42 second portion
12*a* inclination part
12*b* opposed part
12*c* inner surface
12*d* outer surface
20 tape fiber
21 optical fiber
30 elastic member
32*a* linear part
32*b* opposed part
60 round code
61 optical fiber
62 tensile strength fiber
63 sheath
A1 connecting direction
A2 first direction
A3 second direction
K gap
M moving area
P guide pin
S internal space

The invention claimed is:

1. An elastic member configured to bias a ferrule retaining a plurality of optical fibers in a connecting direction, wherein:

the elastic member is stored in a housing configured to accommodate the ferrule, the elastic member has a space in an inside of the elastic member into which a 16-fiber tape fiber is inserted, and the elastic member is in a noncircular shape in a cross section intersecting with the connecting direction, the elastic member comprises:

a pair of first portions having an outer surface opposite to a pair of inner surfaces in an arc shape of the housing, the inner surfaces being opposite to each other along a first direction intersecting with the connecting direction; and a pair of second portions opposite to the tape fiber along a second direction intersecting with both of the connecting direction and the first direction, and the elastic member is in a diamond shape with four rounded corners in the cross section intersecting with the connecting direction.

2. The elastic member according to claim 1, wherein the elastic member is a compressed coil spring in which a wire extends in a spiral shape along the connecting direction.

3. The elastic member according to claim 1, wherein in the cross section intersecting with the connecting direction, the elastic member has a first linear part located on both sides of the first portion in the second direction and extending in the second direction along the inner surface of the housing.

4. The elastic member according to claim 1, wherein the pair of second portions individually have a second linear part extending in the first direction along the inner surface of the housing.

5. The elastic member according to claim 1, wherein a wire is made of a metal.

6. The elastic member according to claim 5, wherein the wire is made of SUS(Steel Use Stainless).

7. The elastic member according to claim 1, wherein end-part polishing is not applied to a wire.

8. An optical connector comprising:
the elastic member according to claim 1;
at least one of the tape fiber;
a ferrule configured to retain a plurality of optical fibers extending from the tape fiber; and a housing configured to store the ferrule and the elastic member, wherein the ferrule has an end face provided at one end of the connecting direction and has a plurality of optical fiber retention holes, the plurality of optical fibers being individually inserted into a plurality of the optical fiber retention holes, a plurality of the optical fiber retention holes being configured to individually retain the plurality of optical fibers, the end face has openings for a plurality of the optical fiber retention holes arranged along the second direction, the plurality of optical fibers is fixed in a state in which tip end faces of the plurality of optical fibers are individually exposed on the openings for a plurality of the optical fiber retention holes, the ferrule is stored in the housing in a state in which the ferrule is biased by the elastic member from an opposite side of the end face in the connecting direction, and the at least one tape fiber is inserted into the space of the elastic member in a noncircular shape.

9. An optical connector comprising:

the elastic member according to claim 1;

a round code having a plurality of optical fibers in a bundle, wherein the elastic member according to claim 1 has a space in an inside of the elastic member into which the round code is inserted instead of the 16-fiber tape fiber;

a ferrule configured to retain the plurality of optical fibers extending from the round code; and a housing configured to store the ferrule and the elastic member, wherein the ferrule has an end face provided at one end of the connecting direction and has a plurality of optical fiber retention holes, the plurality of optical fibers being individually inserted into a plurality of the optical fiber retention holes, a plurality of the optical fiber retention holes being configured to individually retain the plurality of optical fibers, the end face has openings for the plurality of optical fiber retention holes, the plurality of optical fibers extending from the round code is fixed in a state in which tip end faces of the plurality of optical fibers are individually exposed on the openings for a plurality of the optical fiber retention holes, the ferrule is stored in the housing in a state in which the ferrule is biased by the elastic member from an opposite side of the end face in the connecting direction, and the round code is inserted into the space of the elastic member in a noncircular shape.

\* \* \* \* \*